United States Patent
Stricklen

[11] 3,771,845
[45] Nov. 13, 1973

[54] BALL BEARING ASSEMBLY
[75] Inventor: Clifford C. Stricklen, Burnsville, Miss.
[73] Assignee: Paul H. Gleim, Chicago, Ill.
[22] Filed: May 11, 1972
[21] Appl. No.: 252,288

[52] U.S. Cl. .............................................. 308/236
[51] Int. Cl. ............................................. F16c 33/30
[58] Field of Search ..................... 308/236, 196, 72, 308/189, 195

[56] References Cited
UNITED STATES PATENTS
1,767,623   6/1930   Strong ............................... 308/236
2,659,636   11/1953  Wheelis ............................. 308/196
3,304,140   2/1967   Hornigold .......................... 308/236

FOREIGN PATENTS OR APPLICATIONS
513,495   11/1920   France ............................... 308/236

*Primary Examiner*—Charles J. Myhre
*Assistant Examiner*—Frank Sosko
*Attorney*—Alexander B. Blair et al.

[57] ABSTRACT

A ball bearing assembly which can be disassembled and reassembled about a shaft and into a hub without being required to be passed over the end of the shaft. The assembly includes a two-part inner race held together by two-part clamps threaded thereon and a two-part outer race adapted to be inserted into a hub. The bearing ring includes a pair of ball bearing rows arranged side-by-side and separable into two parts to permit assembly around the shaft.

1 Claim, 8 Drawing Figures

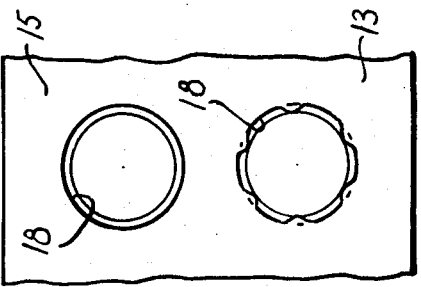
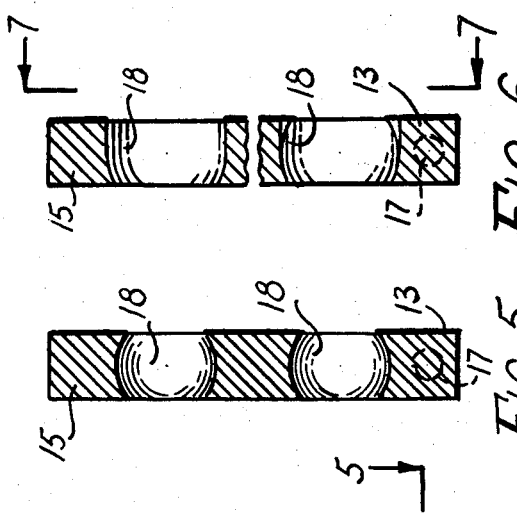
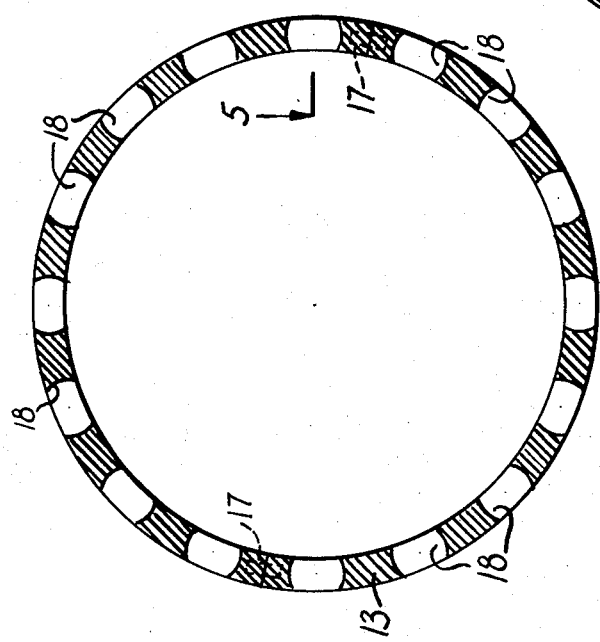
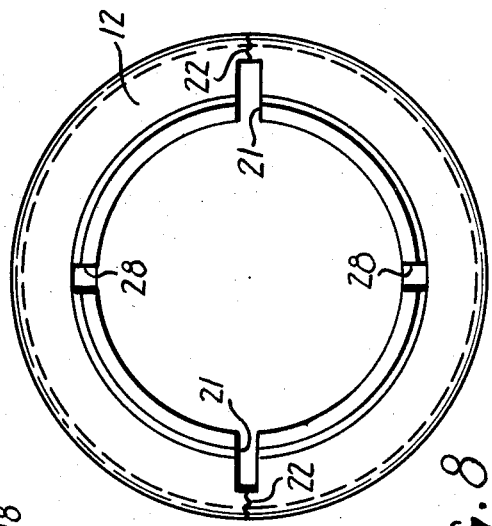

3,771,845

BALL BEARING ASSEMBLY

BACKGROUND OF THE INVENTION

Field of the Invention

The present invention relates to a ball bearing shaft intermediate the ends of the shaft.

SUMMARY OF THE INVENTION

The present invention is an improvement on my U.S. Pat. No. 2,706,137 and includes an inner race which can be assembled on a shaft intermediate the ends thereof without passing over the ends of the shaft, a bearing ring which can then be assembled onto the inner race and an outer race which can be assembled onto the bearing ring and inserted in a hub.

The primary object of the invention is to provide a complete bearing which can be taken apart and assembled around the shaft and in a hub without the necessity of disassembling the shaft and hub.

Other objects and advantages will become apparent in the following specification when considered in the light of the attached drawings.

BRIEF DESCRIPTION OF THE DRAWINGS

FIG. 4 is a vertical sectional view taken along the line 4—4 of FIG. 3 looking in the direction of the arrows;

FIG. 5 is an enlarged transverse sectional view taken along the line 5—5 of FIG. 4 looking in the direction of the arrows;

FIG. 6 is a view similar to FIG. 5 illustrating the method of fastening the ball bearings in the bearing ring;

FIG. 7 is an elevational view taken along the line 7—7 of FIG. 6 looking in the direction of the arrows; and FIG. 8 is a side elevation of the inner race.

DESCRIPTION OF THE PREFERRED EMBODIMENT

Figure 3:
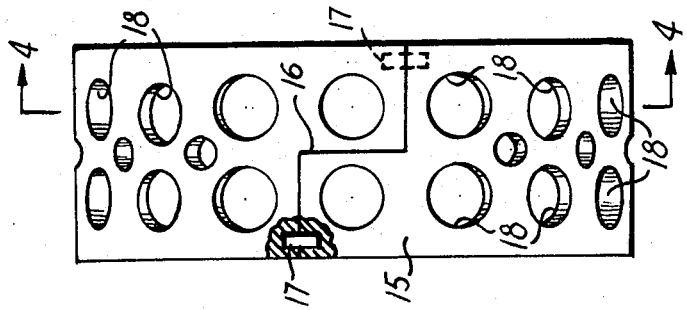
FIG. 3 is an elevational view of the bearing ring shown partially broken away and in section for convenience of illustration.
Figure 2:
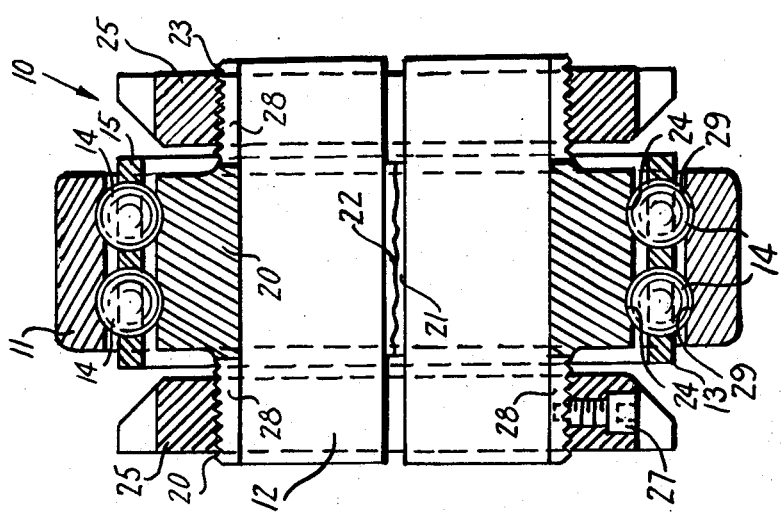
FIG. 2 is a vertical sectional view taken along the line 2—2 of FIG. 1 looking in the direction of the arrows.
Figure 1:
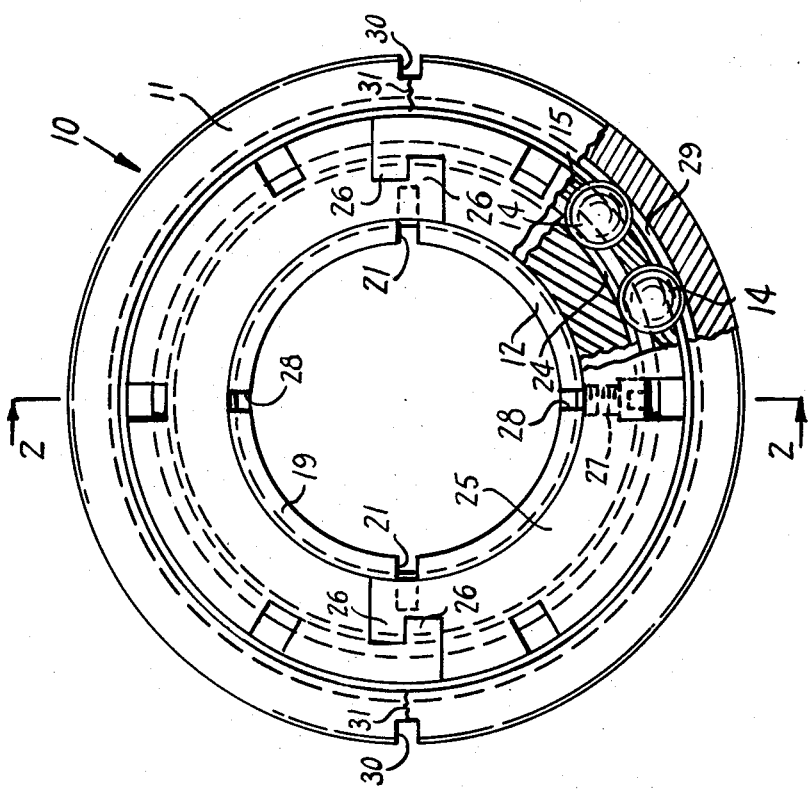
FIG. 1 is a side elevation of the invention shown partially broken away and in section for convenience of illustration.

Referring now to the drawings in detail wherein like reference characters indicate like parts throughout the several figures the reference numeral 10 indicates generally a roller bearing assembly constructed in accordance with the invention.

The roller bearing assembly 10 includes an outer race 11, an inner race 12 and an intermediate bearing ring 13 supporting a plurality of ball bearings 14.

Bearing ring 13 includes a cylindrical member 15 divided along a pair of oppositely disposed offset junctures 16 and connected with dowel pins 17. The cylindrical member when assembled is cylindrical in form in its inner and outer faces and has a plurality of bearing receiving apertures 18 formed therein. The apertures 18 may be formed by drilling completely through the cylindrical member, as illustrated in FIG. 4 and then staking the balls 14 in place therein or they may be formed by drilling partially through the thickness of the member 15 and staking the balls on one side thereof as illustrated in FIG. 6.

The inner race 12 is formed with a generally cylindrical bore 19 having a generally cylindrical upstanding central portion 20 extending outwardly of the inner race 12. A pair of oppositely disposed internal grooves 21 are formed in the inner race 12 and the inner race 12 is broken apart along a break line 22 on opposite sides thereof.

The inner race 12 is externally threaded at 23 on opposite sides thereof and is provided with grooves 24 in its peripheral edges to receive the ball 14 in the bearing ring 13. An inner race locking ring 25 is adapted to be threadably engaged over the externally threaded poritons 23 of the inner race 12 to lock the two pieces of the inner race 12 together along their break lines 22. The rings 25 are provided with interlocking L-shaped members 26 on opposite sides thereof to permit the ring 25 to be divided in half by axial movement. A setscrew 27 extends radially inwardly of the ring 25 to engage in lock grooves 28 formed in the inner race 12.

A generally cylindrical outer race 11 is provided with annular grooves 29 to receive the balls 14 of the bearing ring 13. The outer race 11 is provided with a pair of oppositely disposed transverse grooves 30 and the outer race 11 is broken along break line 31 on opposite sides thereof in the groove 30 to permit it to be separated into a pair of oppositely disposed halves.

The outer race 11 is adapted to fit into a hub which holds it against displacement outwardly of the shaft being supported by the inner race 12.

In the use and operation of the invention the inner race is assembled onto the shaft and the rings 25 are tightened to secure it to the shaft. The bearing ring 13 is assembled onto the inner race 12 and the outer race 11 is assembled onto the bearing ring 13. The hub (not shown) is then slid over the outer race 11 to secure the outer race 11 in its position on the bearing ring 13 so that the bearing assembly 10 provides an anti-friction journal for the hub on the shaft or vice versa.

Having thus described the preferred embodiment of the invention it should be understood that numerous structural modifications and adaptations may be resorted to without departing from the spirit of the invention.

I claim:

1. A ball bearing assembly comprising a two-part inner race for assembly about a shaft with said inner race being divided on opposite sides thereof along break lines generally parallel to the axis of said shaft, said inner race having externally threaded end portions concentric with said shaft, a two-part ball bearing ring mounted on said inner race and divided on opposite sides of said inner race, means interlocking the abutting ends of said bearing ring, a two-part outer race assembled on said bearing ring for rotation thereabout, a pair of internally threaded two-part rings divided on opposite sides of said inner race and having means interlocking their abutting ends, said rings threaded onto the threaded extensions of said inner race to clamp said inner race together on said shaft and a set screw threaded through each of said rings into the respective threaded extensions to lock said threaded ring in assembled position.

* * * * *